United States Patent [19]

Chan

[11] Patent Number: 5,103,910
[45] Date of Patent: Apr. 14, 1992

[54] DELAYED RIGID FOAM SYSTEMS AND APPLICATIONS IN PARTICULAR FOR SELECTIVE PLUGGING TREATMENTS IN THE OIL INDUSTRY

[75] Inventor: Keng S. Chan, Calgary, Canada

[73] Assignee: Dowell Schlumberger Incorporated, Tulsa, Okla.

[21] Appl. No.: 471,200

[22] Filed: Jan. 26, 1990

[30] Foreign Application Priority Data

Jan. 27, 1989 [FR] France ................. 89 01146

[51] Int. Cl.$^5$ ............................................. E21B 33/138
[52] U.S. Cl. ................................... 166/294; 166/292; 166/300; 166/309; 405/263; 405/264
[58] Field of Search .............. 166/270, 294, 295, 300, 166/309, 292; 405/263, 264; 523/130, 132

[56] References Cited

U.S. PATENT DOCUMENTS

| | | | |
|---|---|---|---|
| 3,603,399 | 9/1971 | Reed | 166/292 X |
| 3,614,985 | 10/1971 | Richardson | 166/294 |
| 4,665,986 | 5/1987 | Sandiford | 166/300 X |
| 4,673,038 | 6/1987 | Sandiford et al. | 166/273 X |
| 4,676,318 | 6/1987 | Myers et al. | 166/309 X |
| 4,799,550 | 1/1989 | Harris et al. | 166/294 X |
| 4,848,465 | 7/1989 | Hazlett | 166/309 X |

*Primary Examiner*—George A. Suchfield
*Attorney, Agent, or Firm*—Stephen A. Littlefield

[57] ABSTRACT

The invention comprises a selective plugging treatment with good penetration for acid diversion or water control. The fluid comprises a foamed delayed gelation system.

5 Claims, 1 Drawing Sheet

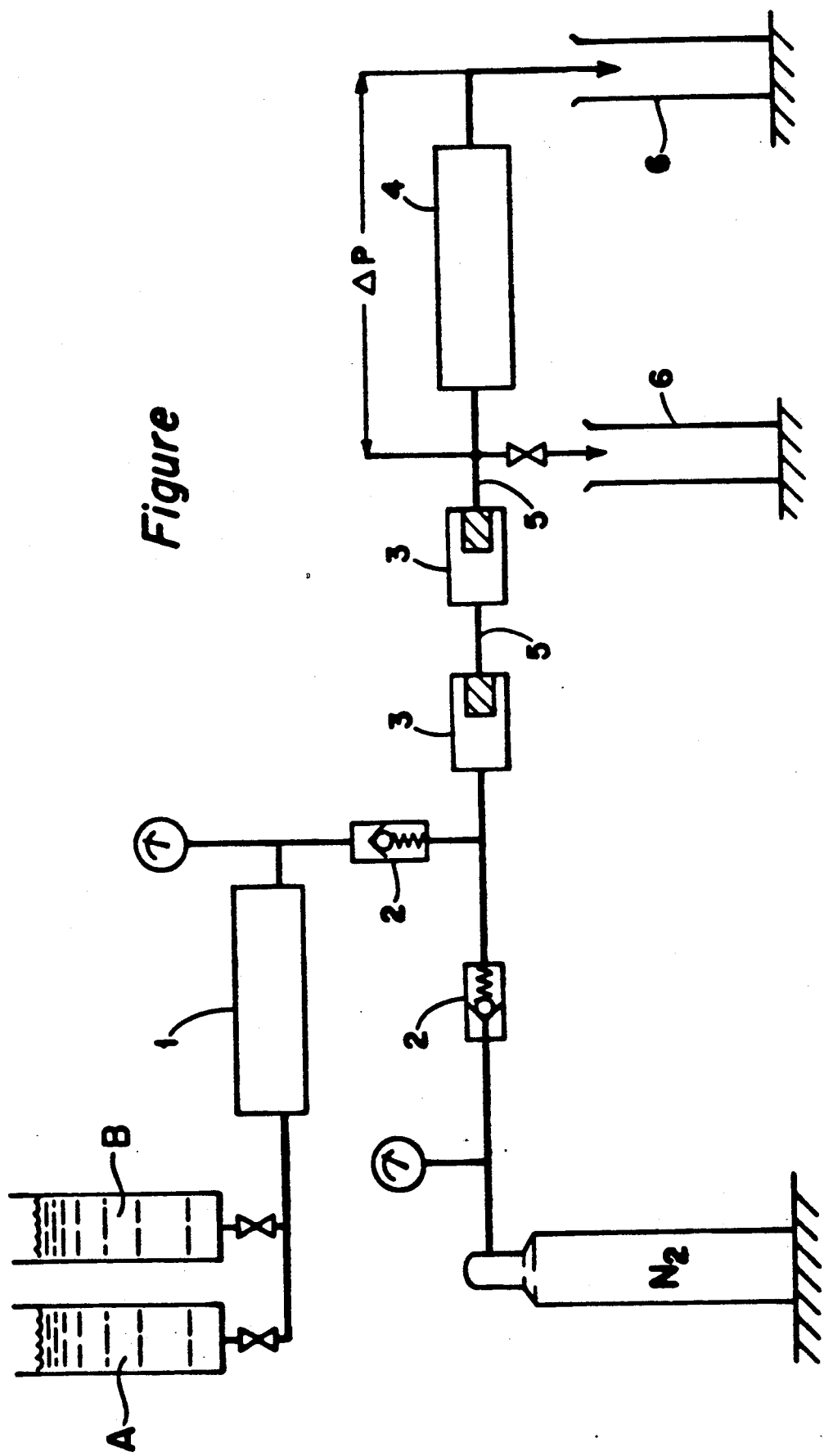
Figure

DELAYED RIGID FOAM SYSTEMS AND APPLICATIONS IN PARTICULAR FOR SELECTIVE PLUGGING TREATMENTS IN THE OIL INDUSTRY

BACKGROUND OF THE INVENTION

The invention is related to delayed gelation systems that can be particularly used for water control processes in the oil industry.

This type of processing for some underground formations, crossed by injection or production bore holes, is well known in principle to those skilled in the art, as well as the difficult problems which it raises. It will be useless to discuss here these operations. This invention is concerned with selectivaly plugging an underground zone able to allow a water invasion into a producing layer.

It was first proposed, in the U.S. Pat. No. 3,614,985, using urea and aluminium chloride to cause a delayed aluminium hydroxyde precipitation.

The French patent application no. 85 10 272 applied July 2, 1985 proposed using aluminium hydroxychloride which allows accurately controlling the precipitation time, the structure and the morphology of the precipitate.

The French patent application no. 86 06434 applied Apr. 30, 1986 proposes using hexamethylenetetramine and the French patent application no. 86 14089 applied Oct. 8, 1986 recommends the adjunction of an adjuvant for the activator (sodium cyanate).

The teaching of all the above mentioned documents is incorporated here as a reference and those skilled in the art can refer to those.

The above discussed techniques have reached an efficiency and an accuracy which are satisfactory taking into account the extreme difficulty of the technical problem raised.

An object of the invention is to further improve some aspects of these techniques and to substantially reduce their cost which in between has become an absolutly determining parameter in the oil industry.

Namely, one of the major inconveniences of the water control techniques generally is their very high cost. This is caused by the necessity of using large volumes of fluid to obtain the desired effect. Namely, it is very often necessary to treat the permeable basin over several meters, possibly several tens of meters, depth and not only in the immediate surroundings of the bore hole.

SUMMARY OF THE INVENTION

According to the invention, it is proposed to present the delayed gelation (or precipitation) systems of the above mentioned type, as foamed systems.

It will be possible either to inject liquid systems for in situ foaming at the level of the formation, or to directly surface or bore-hole form the foam, and therefore inject the product directly in the form of a foam into the formation.

In the case where the foam is generated in situ, it will preferably be possible first to inject into the formation to be treated a volume of fluid including a foaming agent and the various additives susceptible to cause the gel structure formation with a certain delay (see above mentioned patents). The gas, preferably nitrogen or air or carbon dioxide will then be injected in order to form the foam in the porous medium. When the injected gas volume is satisfactory to realize the desired foam amount, a new fluid volume including the above mentioned additives is injected and the process is repeated until the total volume desired for the process has been injected.

The foams have been used in controlling moving fluid mobility for a steam injection aided production. Their application is also known in hydraulic fracturing. The rheology of the foams and their fluid moving properties in a porous medium have been intensely studied and published. The practical use of those foams in the field also raises no particular problem. A foam is a fine dispersion of a gas in a liquid, generally water or oil based, phase. This foam is generated when surface-active agents or surfactants, also called in this case foaming agents, are added to the liquid phase and when the gas-liquid mixture is formed under heavy turbulence condition.

The foam quality is a qualitative measure of the relative gas quantity,under the pressure and temperature conditions of the basin, as compared to the total foam volume. It clearly appears that the foam quality will have a major influence on the processing cost, for a same total fluid volume.

There however exists no application of the foams in the very particular field of water control, where it was seen that it raises very specific and arduous problems, in particular the necessity of selectivly placing the processing fluids, i.e. only into the water zone, of using the least possible fluid quantity, and of opposing for a long period any new water invasion into the oil producing layer.

The invention solves these problems even though, a high quality foam paradoxically conveys much less active plugging product than a comparable liquid volume. It seemed impossible to efficiently and durably plug a zone with a much smaller active product quantity than in the previous and the most recent techniques. In addition, it did not seem possible to efficiently control the selective placement of foam into the formation (an essential criterion of success) since this placement already is delicate with the liquid which, by nature, is better controlled than a foam. It also seemed impossible to build up a foam which stands for several hours (necessary gelation time) in the temperature and pressure conditions of a bore hole bottom.

According to the invention, control of the placement and the gelation time (or precipitation) with a high precision and a better injectivity, a better selectivity relative to high permeability zones, and a decrease of the risk of processing fluid invading adjacent oil zones are obtained.

It will of course be noted that foams can bas well be formed in the bore holes as well with conventional water control techniques, which are based on synthetic polymers, for instance polyacrylamide, or natural polymers or biopolymers, like xanthane gum. But even in the case where those polymeric systems would have a more or less controled or delayed gelation by a known redox system, the final foam would still be a fluid, the consistency of which will only depend upon the quantity of the polymers used.

When a foam is formed with such a polymer containing solution, the latter rigidify the bubble wall, thus limiting the injectivity of the foam into the porous medium. It will thus be necessary to be able to inject a polymer containing solution or foam into a porous medium, over a satisfactory distance around the bore hole to limit the polymeric concentration to extremely low concentrations.

The fact that polymeric concentrations are very weak and the fact that the continuous foam phase stays liquid, even if it is more and less viscous, would present a pratical use of a foam with those conventional techniques.

The invention therefore consists, under one of its aspects, in injecting, or in situ forming, a foam composed of an aqueous phase containing no polymers. This allows keeping a very good injectivity of the foam into the porous medium.

The invention on the other hand consists in that the liquid foam phase, which during the injection has a viscosity approaching the water viscosity, after a time, which can be adjusted as a function of the formation temperature by the aluminium hydroxychloride and various activator quantities according to the same temperature, forms a mineral colloidal gel. This mineral gel which is obtained by aluminium precipitation under a colloidal form, will give a rigid structure to the foam. Thus, contrary to the classical polymer containing foams, (if those could be injected in a homogenous way into the porous medium), it is formed, according to the invention, a rigid foam after a totally controlable time, and without affecting the process fluid injectivity.

BRIEF DESCRIPTION OF THE DRAWING

The invention will be described in conjunction with the accompanying drawing forming a part of this specification and in which the sole FIGURE represents apparatus useful in forming the foamed fluid of the invention.

DETAILED DESCRIPTION OF THE PREFERRED EMBODIMENT AND THE DRAWING

The following tests were realized in laboratory. In the preliminary tests, parent solutions containing respectively 12% (weight) aluminium hydroxychloride and 1% sodium cyanate were prepared. 10 cm$^3$ of each solution were introduced in a 250 cm$^3$ bottle. 5 ml of the various foaming agents were introduced. After covering, the bottle was strongly agitated.

Foaming agent:
Test 1 - cationic:*
Test 2 - nonionic: Di-isobutylphenol + 10 moles ethyleneoxide
Test 3 - anionic: Sodiumdodecylbenzenesulfonate
Test 4 - Sodiumlaurylethersulfate.

*Mixture: ⅓ bis coprahbis(2-hydroxyethyl)amineoxide
⅓ trimethylcoprahammoniumchloride.

In all cases the stable foam was formed. Then after a time determined by the sodium cyanate quantity, the gel was formed and in each case a rigid foam was obtained.

These tests show that various foaming agents can be selected without affecting the quality of the final result.

Test with the above mentioned foaming agents also were realized on drilling cores positioned in the laboratory installation described in the single accompanying figure in which:

(1) represents a "LEAWA" triples pump
(2) represents one way valves
(3) represents 15Mm filters
(4) represents a pressure cell containing the rock drilling core
(5) represents a transparent tube for visual control
(6) represents visual controling probes for the foam.

DP represents the difference between inlet and outlet pressures of the cell containing the drilling core 4. (A) and (B) represent the delayed gelation foaming system components.

The test performance consists of injecting 3% NaCL solution to measure the initial permeability of the rock, then injecting for 20 minutes the foam formed by (A), (B) and nitrogen into the cell containing the 4 drilling core until the rock pores are completely filled. The injection is then stopped for the predetermined time (see above mentioned French patents) necessary for components gelation.

An inert fluid pressure (3% NaCl) is then applied onto the drilling core until the permeability stabilizes.

All tests were including in the sense that the NaCl solution flowing in the acceptance probe 6 placed on the output of the cell 4 showed a permeability reduction of about 80 to 99% of the initial permeability due to solidified foam.

According to an other aspect, the invention concerns the combination of the delayed gelation system in foam with 0,5 to 3% of oil. The presence of this small oil quantity, according to three quantitative tests realized in the single figure apparatus, and to the above operating mode, clearly improves the stability of the foam and consequently its performances.

I claim:

1. A method for selectively plugging an underground formation comprising the steps of:
   (a) providing a delayed gelation system comprising an aluminum salt selected from a group consisting of: aluminum chloride and aluminum hydroxychloride, and a weak base selected from a group consisting: of urea and hexamethylenetetramine:
   (b) adding a gas to the delayed gelation system to form a foam:
   (c) injecting the delayed gelation system into a formation, and
   (d) shutting in the well for a period of time.

2. The method as set forth in claim 1 wherein the step of adding a gas comprises adding a gas selected from a group consisting: of nitrogen, air and CO$_2$.

3. The method as set forth in claim 1 wherein the step of adding a gas is effected prior to the step of injecting.

4. The method as set forth in claim 1 wherein the step of adding the gas is subsequent to the step of injecting the delayed gelation system into the formation.

5. The method as set forth in claim 1 wherein the step of providing a delayed gelation system further includes the step of providing a sodium cyanate activator.

* * * * *